United States Statutory Invention Registration [19]

[11] Reg. Number: H296

Zabel [43] Published: Jul. 7, 1987

[54] ELASTIC PULLER SABOT FOR SMALL CALIBER FLECHETTE

[75] Inventor: Patrick H. Zabel, Devine, Tex.

[73] Assignee: The United States of America as represented by the Secretary of the Army, Washington, D.C.

[21] Appl. No.: 852,462

[22] Filed: Apr. 4, 1986

[51] Int. Cl.[4] ..... F42B 13/16

[52] U.S. Cl. ..... 102/521

[58] Field of Search ..... 102/520–523

[56] References Cited

U.S. PATENT DOCUMENTS

| | | | |
|---|---|---|---|
| 3,111,902 | 11/1963 | Taylor | 102/521 |
| 3,164,092 | 1/1965 | Reed et al. | 102/522 |
| 4,574,703 | 3/1986 | Halverson | 102/520 |

*Primary Examiner*—Harold J. Tudor

*Attorney, Agent, or Firm*—Anthony T. Lane; Harold H. Card, Jr.; Michael C. Sachs

[57] ABSTRACT

An elastic puller sabot for use with a small caliber flechette to be launched from a bore of a launcher. The sabot comprises at least two portions, which, when placed together, have an interior surface conforming to the shape of the flechette, and an exterior surface conforming to the shape of the bore. The sabot preferably comprises a material which is capable of deforming elastically inward about the flechette, to grip it securely during launch, and outward toward the interior of the bore, to improve the sealing of the flechette in the bore, without the need for a retaining member.

9 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELASTIC PULLER SABOT FOR SMALL CALIBER FLECHETTE

GOVERNMENTAL INTEREST

The Government has rights in this invention pursuant to contract number DAAK-10-81-C-0292 awarded by the Department of the Army.

SUMMARY OF THE INVENTION

The present invention relates to military ordnance and, more particularly, to an elastic puller sabot for use with a flechette launched individually at a high velocity from a small caliber weapon. This invention does not apply to flechettes launched multiply from artillery shells or the like shot from a shot gun or pistol cartridges which are launched at much lower velocities.

A flechette is a common military missile which is shaped generally similar to a dart or arrow, i.e. it has a relatively long slender body, at one end of which are disposed guiding fins. Flechettes are launched individually toward a target from a launcher having a bore.

Owing to the configuration of the flechette, they are difficult to launch from a launcher having a bore. Specifically, the guiding fins of the flechette define a diameter which extends well beyond the diameter of the body of the flechette. Thus, the diameter of the launcher bore must be no smaller than that of a circle defined by the diameter of the guiding fins. Otherwise, the flechette will not fit through the bore. The diameter of the bore is generally far greater than that of the body of the flechette, and so a sabot is used to retain the flechette within the bore.

A sabot, or shoe, comprises at least two pieces of a hard material placed over the exterior of a front portion of the body of the flechette as a covering before the flechette is launched. The interior of the sabot conforms to the shape of the exterior of the body of the flechette. The exterior of the sabot generally conforms to the shape of the interior of the bore, and has a diameter greater than that of the guiding fins.

The rear end of the sabot, together with the rear portion of the flechette including the guiding fins, is encased within a cartridge which serves to hold the sabot and flechette together. Additionally, the cartridge will retain therein gunpowder or other propellant with which the flechette is launched from the bore.

The front end of the sabot conventionally is configured aerodynamically, so that once the flechette/sabot assembly leaves the muzzle of the launcher, the sabot is aerodynamically peeled away from the flechette, thereby permitting the flechette to fly toward its target unfettered by the sabot. The sabot, having served its purpose, falls to the ground. A common configuration of the front end of a sabot is that of a cup, with the rim of the cup at the front end of the sabot, and the bottom of the cup toward the rear thereof. The pressure of the air on the bottom of the cup after launching peels the sabot away from the flechette.

Conventional sabots are made of a hard and inelastic material, such as, for example, fiberglass-reinforced plastic, and so generally are extremely rigid. This is considered necessary, so that the sabot will not dissipate the propulsive energy applied to its rear end during launching.

A problem arises with the use of a sabot, namely retaining the sabot in place with respect to the flechette during launching. Since the force applied to the sabot/- flechette assembly during launching is directed axially thereto, and much of that force is applied to the sabot, the sabot tends to slip off the flechette. To counteract such a tendency, a radial force is exerted between the flechette and the sabot, thereby holding the sabot in place.

In some applications, this is accomplished by providing a slight tapering at the rear of the sabot. When the propulsive force is applied to this tapering, a portion of the (axial) propulsive force is translated into a radially inward retaining force, tending to retain the sabot in place about the flechette.

This tapering has a disadvantage, since it serves to dissipate a portion of the propulsive force. Additionally, forcing the rigid sabot against the flechette leaves a small space between the exterior of the sabot and the interior of the bore, through which a portion of the propulsive force may leak.

Also, the sabot has an exterior diameter which is equal to or slightly less than that of the bore. Any difference in dimension leaves a small space between the sabot and the interior surface of the bore, through which a portion of the propulsive force may dissipate. Furthermore, the existence of the small space between the sabot and the bore means that the sabot is not retained tightly within the bore, and so has a slight freedom to separate while in the bore. Any separation of the pieces of the sabot is also extremely undesirable, since it will further permit some dissipation of the propulsive force therebetween, and will permit the sabot to release the flechette.

In some applications, a retaining member, or obturator, such as a rubber band, is affixed about the sabot, to exert a radially inward retaining force. The obturator also serves to fill the small space between the sabot and the interior of the bore, and so seals off the bore from any leaking of propulsive energy about the sabot, or between its pieces. The use of an additional retaining member is also a disadvantage, however, since it increases the cost of the assembly, and adds to the labor involved in its construction.

OBJECTS AND SUMMARY OF THE INVENTION

Accordingly, it is an object of the invention to provide a sabot which overcomes the drawbacks of the prior art.

It is a further object of the invention to provide an elastic puller sabot which is retained in place about a flechette without the need for an additional member.

It is a still further object of the invention to provide an elastic puller sabot which fits securely within the bore of a launcher.

It is a still further object of the invention to provide an elastic puller sabot which does not require the translation of a portion of the propulsive force to retain the sabot in place during launching.

It is a still further object of the invention to provide an elastic puller sabot which comprises an elastic material which is capable of elastic deformation to hold the sabot in place about the flechette.

Briefly stated, there is provided an elastic puller sabot for use with a small caliber flechette to be launched from a bore of a launcher. The sabot comprises at least two portions, which, when placed together, have an interior surface conforming to the shape of the flechette, and an exterior surface conforming to the shape of the bore. The sabot preferably comprises a material which is, but capable of deforming elastically inward about the flechette, to grip it securely during launch, and outward toward the interior of the bore, to improve the sealing of the flechette in the bore, without the need for a retaining member.

In accordance with these and other objects of the invention, there is provided an elastic puller sabot for use in launching a flechette from a launcher having a bore, comprising at least two sabot portions, the at-least-two sabot portions together forming the sabot, and together having an interior surface and an exterior surface, the interior surface having a generally identical shape to that of an exterior of the flechette, the exterior surface having a generally identical shape to that of an interior of the bore, the exterior surface further having a diameter no smaller than that of the interior of the bore, each of the at-least-two sabot portions being comprised of an elastic material.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
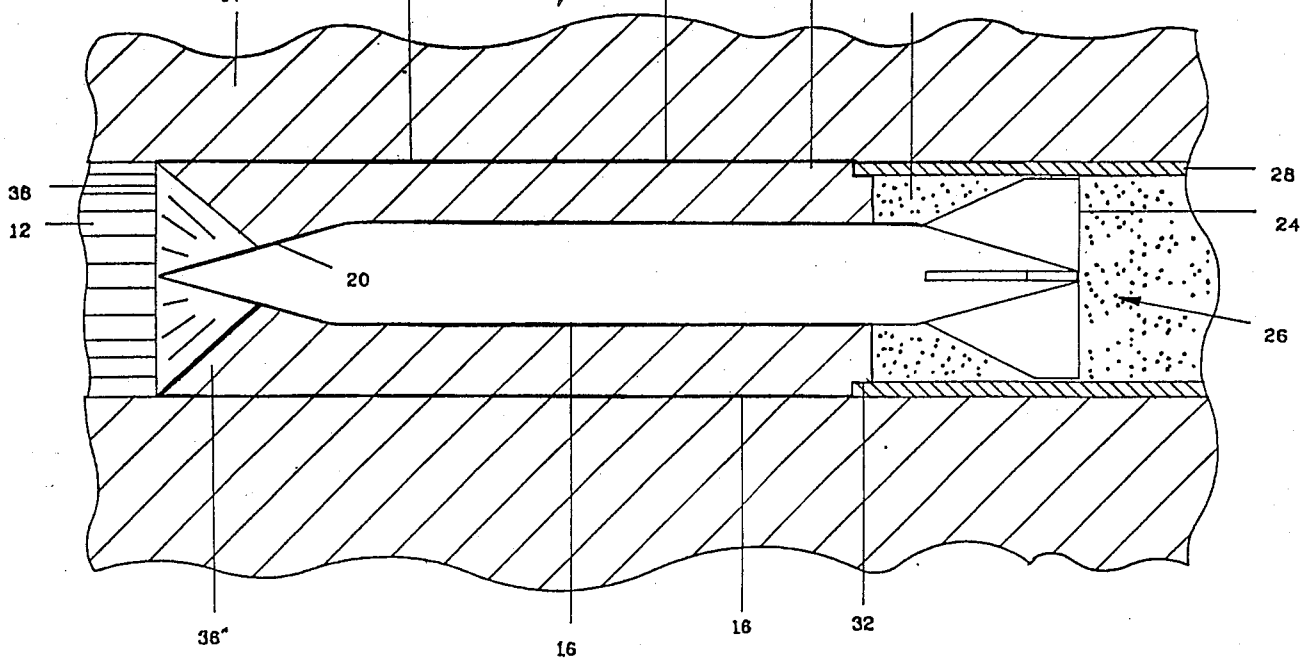
FIG. 1 is a cross section of an elastic puller sabot in accordance with a preferred embodiment of the invention, shown at rest.

Referring now to FIG. 1, there is shown, generally at 10, a sabot/flechette assembly in accordance with a preferred embodiment of the invention. Sabot/flechette assembly 10 is shown in its operative position within a bore 12 of a launcher 14. Extraneous elements of launcher 14 are omitted from the drawing, for clarity of description.

Sabot/flechette assembly 10 comprises a flechette 16 and a sabot 18 disposed about flechette 16. Flechette 16 is conventional, and comprised of any conventional material, such as, for example, steel or depleted uranium, and has a pointed front end 20, a relatively long, slender body 22, and a set of fins 24 disposed at a rear end 26 thereof. It will be appreciated that the widest part of flechette 16 is fins 24.

A cartridge case 28 encloses rear end 26, and contains therein a portion of a charge, such as gunpowder 30, used to launch sabot/flechette assembly 10 from bore 12. Cartridge case 28 secures sabot 18 in place about flechette 16, by grasping a notch 32 disposed at a rear end 34 thereof.

Sabot 18 is made up of at least two sabot portions 36' and 36'', having complementary shapes, which, when placed together completely enclose flechette 16. Together, sabot portions 36' and 36'' have an exterior diameter which is no smaller than, and preferably larger than, that of the interior of bore 12. Thus, sabot 18 overfills bore 12 when inserted thereinto.

A front end 38 of sabot 18 is aerodynamically shaped so that, when sabot 18 is launched from bore 12, the force of air pressing thereagainst causes sabot portions 36' and 36'' to peel away from flechette 16, so that it may continue unfettered to its intended target. By and large, the appearance of sabot/flechette assembly 10 is identical to conventional sabot/flechette assemblies. Inventive sabot/flechette assembly 10 differs from the prior art primarily in the material of which sabot 18 is composed.

Sabot 18 comprises an elastic material, preferably one which acts as an extremely viscous fluid. Appropriate materials are: a polycarbonate sold under the trademark Lexan 101, manufactured by the General Electric Company (the most preferred); one of three liquid crystal polymers sold by the Celanese Corporation, under the trademarks LCP-2000 (unreinforced), LCP-2130 (thirty percent fiberglass reinforced), and LCP-2530-15 (fifteen percent mineral-filled); and a thermo-plastic polyester resin having a ten percent fiberglass reinforcement, sold under the trademark PDR-409, by the General Electric Company.

Chief among the characteristics shared by the recited materials is the ability to flow, albeit extremely slowly, when subjected to high pressures. Thus, the material of which sabot 18 is made must be an extremely viscous fluid. This contrasts with the materials of which prior art sabots are made, which materials are invariably solid.

This difference in material is crucial to an understanding of the improved operation of inventive sabot/flechette assembly 10, vis-a-vis known sabot/flechette assemblies. When a prior art sabot/flechette assembly is launched from its launcher, the propulsive force imparted by the exploding charge therebehind acts on the rear of the sabot, generally axially along the length of the bore to propel the sabot/flechette assembly in the desired direction. This action is well understood by all those of ordinary skill in the art.

Only by tapering the rear of the sabot does any component of the axial force applied in conventional sabot/flechette assemblies, however, urge the sabot toward the flechette. Other means are also necessary to force the sabot and flechette together.

Figure 2:
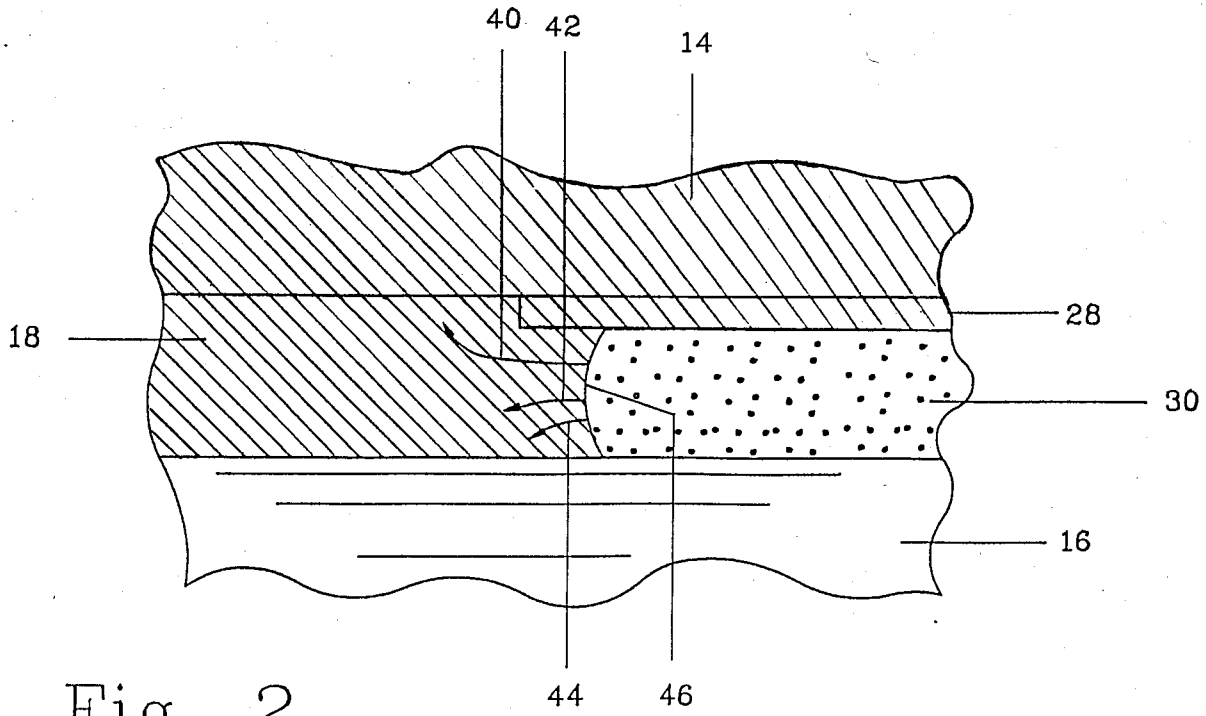
FIG. 2 is a detail of the view of FIG. 1, showing a portion of the inventive elastic puller sabot while active.

As shown in FIG. 2, the fluid material of sabot 18 acts differently from a solid sabot. A fluid does not move linearly with respect to a force imparted thereto. Rather, a fluid material first flows away from the imparted force in all directions, as shown by arrows 40, 42 and 44, and then moves. The propulsive force imparted to rear end 34 deforms sabot 18 against the interior of bore 12, and against the exterior of flechette 16, thereby creating an indentation 46 (shown greatly exaggerated in FIG. 2). Thus, sabot 18 is retained in place about flechette 16, without the need for tapering rear end 34, and without using an obturator.

The static coefficient of friction between sabot 18 and flechette 16 should improve the ability of sabot 18 to grip the flechette 16. In the preferred embodiment, the static coefficient of friction between Lexan 101 and steel is 0.39.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention.

What is claimed is:

1. An elastic puller sabot for use in launching a flechette from a launcher having a bore, comprising:

at least two sabot portions;

said at-least-two sabot portions together forming said sabot, and together having an interior surface and an exterior surface;

said interior surface having a generally identical shape to that of an exterior of said flechette;

said exterior surface having a generally identical shape to that of an interior of said bore, said exterior surface further having a diameter no smaller than that of said interior of said bore;

each of said at-least-two sabot portions being comprised of an elastic material.

2. An elastic puller sabot according to claim 1, wherein said elastic material is a polycarbonate.

3. An elastic puller sabot according to claim 1, further comprising means for urging said exterior surface of said sabot against said interior surface of said bore, and also for urging said interior surface of said sabot against said exterior surface of said flechette in response to a propulsive force, whereby said sabot and said flechette are propelled from said bore with a dissipation of a minimum of said propulsive force.

4. An elastic puller sabot according to claim 1, wherein said elastic material is a thermal plastic polymer resin having a fiberglass reinforcement of about ten percent.

5. An elastic puller sabot according to claim 1, wherein said elastic material is a liquid crystal polymer.

6. An elastic puller sabot according to claim 5, wherein said liquid crystal polymer is unreinforced.

7. An elastic puller sabot according to claim 5, wherein said liquid crystal polymer has a fiberglass reinforcement of no more than thirty percent.

8. An elastic puller sabot according to claim 5, wherein said liquid crystal polymer has a mineral fill reinforcement of no more than fifteen percent.

9. An elastic puller sabot according to claim 1, wherein said at-least-two sabot portions together define a rear surface of said sabot, and said rear surface is generally perpendicular to the exterior surface of said flechette.

* * * * *